United States Patent
Chiu et al.

(10) Patent No.: US 12,542,799 B2
(45) Date of Patent: Feb. 3, 2026

(54) METHODS, SYSTEMS AND COMPUTER PROGRAM PRODUCTS FOR PREDICTING ATTACKED PATHS ON ENTERPRISE NETWORKS

(71) Applicant: CyCraft Singapore Pte., Ltd, Singapore (SG)

(72) Inventors: Ming-Chang Chiu, New Taipei (TW); Pei-Kan Tsung, New Taipei (TW); Ming-Wei Wu, New Taipei (TW); Cheng-Lin Yang, New Taipei (TW); Che-Yu Lin, New Taipei (TW); Sian-Yao Huang, New Taipei (TW)

(73) Assignee: CyCraft Singapore Pte., Ltd, Singapore (SG)

( * ) Notice: Subject to any disclaimer, the term of this patent is extended or adjusted under 35 U.S.C. 154(b) by 203 days.

(21) Appl. No.: 18/207,924

(22) Filed: Jun. 9, 2023

(65) Prior Publication Data
US 2024/0056469 A1   Feb. 15, 2024

(30) Foreign Application Priority Data

Jun. 9, 2022   (TW) .................................. 111121467
May 26, 2023  (TW) .................................. 112119618

(51) Int. Cl.
    *H04L 9/40*  (2022.01)
(52) U.S. Cl.
    CPC ........ *H04L 63/1433* (2013.01); *H04L 63/105* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2016/0205122 A1* | 7/2016 | Bassett | H04L 63/1441 726/23 |
| 2017/0324758 A1* | 11/2017 | Hart | H04L 63/0428 |
| 2020/0314128 A1* | 10/2020 | Hild | H04L 63/1416 |
| 2021/0064751 A1* | 3/2021 | Li | G06F 18/2413 |
| 2021/0185086 A1* | 6/2021 | Zegeye | G06F 18/295 |
| 2022/0019670 A1* | 1/2022 | Moriarty | G06F 21/554 |
| 2023/0259633 A1* | 8/2023 | Oddo | H04L 63/1433 726/25 |
| 2023/0275909 A1* | 8/2023 | Shivamoggi | H04L 63/1441 726/23 |
| 2023/0315609 A1* | 10/2023 | Bartling | G06F 21/54 717/126 |
| 2023/0336581 A1* | 10/2023 | Dunn | G06F 21/577 |

(Continued)

*Primary Examiner* — Scott B Christensen
(74) *Attorney, Agent, or Firm* — Andrew M. Calderon; Calderon Safran & Wright P.C.

(57) ABSTRACT

A method for predicting an attacked path on enterprise networks includes: obtaining a plurality of accounts, a plurality of machines and network resource data, where the plurality of machines include at least one attacked target; calculating, according to the network resource data, a plurality of evaluated values of executing access on other machines of each account logging in at least one machine; and presenting an attacked path where a machine at least one account logs in accesses the attacked target directly, or indirectly by connecting to other machines, and the machine the at least one account logs in points to the attacked target directly, or indirectly by connecting to other machines.

5 Claims, 3 Drawing Sheets

(56) References Cited

U.S. PATENT DOCUMENTS

2023/0370491 A1* 11/2023 Crabtree ................ G06N 3/098
2025/0024349 A1* 1/2025 Hernandez Moran .......................
                                                    H04W 40/34

* cited by examiner

METHODS, SYSTEMS AND COMPUTER PROGRAM PRODUCTS FOR PREDICTING ATTACKED PATHS ON ENTERPRISE NETWORKS

CROSS-REFERENCES TO RELATED APPLICATIONS

This non-provisional application claims priority under 35 U.S.C. § 119 (a) to Patent Application No. 111121467 filed in Taiwan, R.O.C. on Jun. 9, 2022 and Patent Application No. 112119618 filed in Taiwan, R.O.C. on May 26, 2023, the entire contents of which are hereby incorporated by reference.

BACKGROUND

Technical Field

The present disclosure is a prediction method for predicting an attack path of hackers, software and a server, as well as a presentation method for predicting an attacked path, in particular a method, a system and a computer program product for performing analysis via men (accounts), machines, network resources and an enterprise network environment composed thereof.

Related Art

With the development of network resources, various enterprises will carry out various resource sharing or data transmission using a network architecture, and hackers will also carry out attack by using network related weaknesses, in order to achieve the purpose of data stealing or destruction. In order to avoid losses caused by intrusion, many enterprises have begun to look for possible security vulnerabilities through experts. At present, the way to look for vulnerabilities is nothing more than simulating the attack of a network hacker, that is, simulating an intrusion via some single machines, but this way not only costs a lot of money, but also takes a long time, which needs to be improved for enterprises that are always at risk.

SUMMARY

To overcome the above problems, the present disclosure provides a method that can complete hacker intrusion simulation in less time than a conventional technique. In the present disclosure, analysis is performed from a macro domain perspective to look for a possible single machine or account breach, and a path that can be breached or favored is displayed, in order to facilitate rapid vulnerability repair or corresponding operations by a data security person.

In the present disclosure, simulation arithmetic is performed by applying the analysis of men, machines, network resources, and a network environment composed thereof, where if a Microsoft Windows server system is taken as an example, a commonly used AD (active directory) server in the system includes the related data about the men, machines and network resources mentioned previously, where the man refers to an account logging in the machine. In the Microsoft Windows server, the active directory is responsible for centralized directory services of a large-scale network environment in the architecture, and is used for processing network objects within a company. The object may be related data about a user account, a user group, a user computer, a domain controlling apparatus (also referred to as a domain control station), a mail or a mail system, a system configuration file, an organizational unit, a forest and the like, and further, the object can also be explained as an object defined in the active directory structure schema, wherein this object can be stored in an active directory (AD) data file, and is accessed by using an AD service interface. Additionally, AD can also be used for recording server software, domain data structures, credentials, federation, privilege control and lightweight services.

The present disclosure overcomes the problems in the prior art, and provides a prediction method, software and a server, capable of predicting an attack path of hackers, as well as a presentation method for predicting an attacked path, in particular a method and software for performing analysis via men, machines, network resources and a network environment composed thereof, and a server installed with the software corresponding to the method, as well as a method for presenting results after the combination of the men, the machines and the network resources. Through the presentation method of the present disclosure, an analyst can more intuitively and quickly grasp a key account.

The present disclosure provides a presentation method for predicting an attacked path on enterprise networks, including: obtaining a plurality of accounts, a plurality of machines and network resource data, where the plurality of machines include at least one attacked target, and the plurality of accounts or the plurality of machines have their respective privilege levels; calculating, according to the network resource data, a plurality of evaluated values of executing access on other machines of each account logging in at least one machine; and presenting an attacked path where a machine at least one account logs in accesses the attacked target directly, or indirectly by connecting to other machines, and pointing to the attacked target directly, or indirectly by connecting to other machines, on the attacked path from the machine the at least one account logs in.

The present disclosure provides a method for predicting an attacked path on enterprise networks, including: obtaining a plurality of accounts, a plurality of machines and network resource data, and the plurality of accounts or the plurality of machines having their respective privilege levels; determining, according to the network resource data, one of the plurality of machines being an attacked target; calculating a plurality of evaluated values of executing access on other machines of all accounts logging in at least one machine; calculating an evaluated value of at least one path where all accounts log in at least one machine to access the attacked target directly, or an evaluated value of at least one path where all the accounts access the attacked target indirectly by connecting to other machines; and determining, according to the evaluated value of the at least one path, whether the at least one path is an attacked path or not.

The present disclosure provides a computer program product, the program being loaded by a computer to execute: a program instruction such that a microprocessor reads records of a plurality of accounts, a plurality of machines and network resource data, where the plurality of machines include at least one attacked target, and the accounts or machines have their respective privilege levels; a program instruction such that the microprocessor calculates, according to the network resource data, a plurality of evaluated values of executing access on other machines of each account logging in at least one machine; and a program instruction such that the microprocessor presents an attacked path where a machine at least one account logs in accesses the attacked target directly, or indirectly by connecting to other machines, and the machine the at least one account logs in points to the attacked target directly, or indirectly by connecting to other machines.

The present disclosure provides a computer program product, the program being loaded by a computer to execute: a program instruction such that a microprocessor reads records of a plurality of accounts, a plurality of machines and network resource data, where the accounts or machines have their respective privilege levels; a program instruction such that the microprocessor determines, according to the network resource data, one of the plurality of machines being an attacked target; a program instruction such that the microprocessor calculates a plurality of evaluated values of executing access on other machines of all accounts logging in at least one machine while executing access on other machines; a program instruction such that the microprocessor calculates an evaluated value of at least one path where all accounts log in at least one machine to access the attacked target directly, or an evaluated value of at least one path where all the accounts access the attacked target indirectly by connecting to other machines; and a program instruction such that the microprocessor determines, according to the evaluated value of the at least one path, whether the at least one path is an attacked path or not.

DETAILED DESCRIPTION

Figure 1:
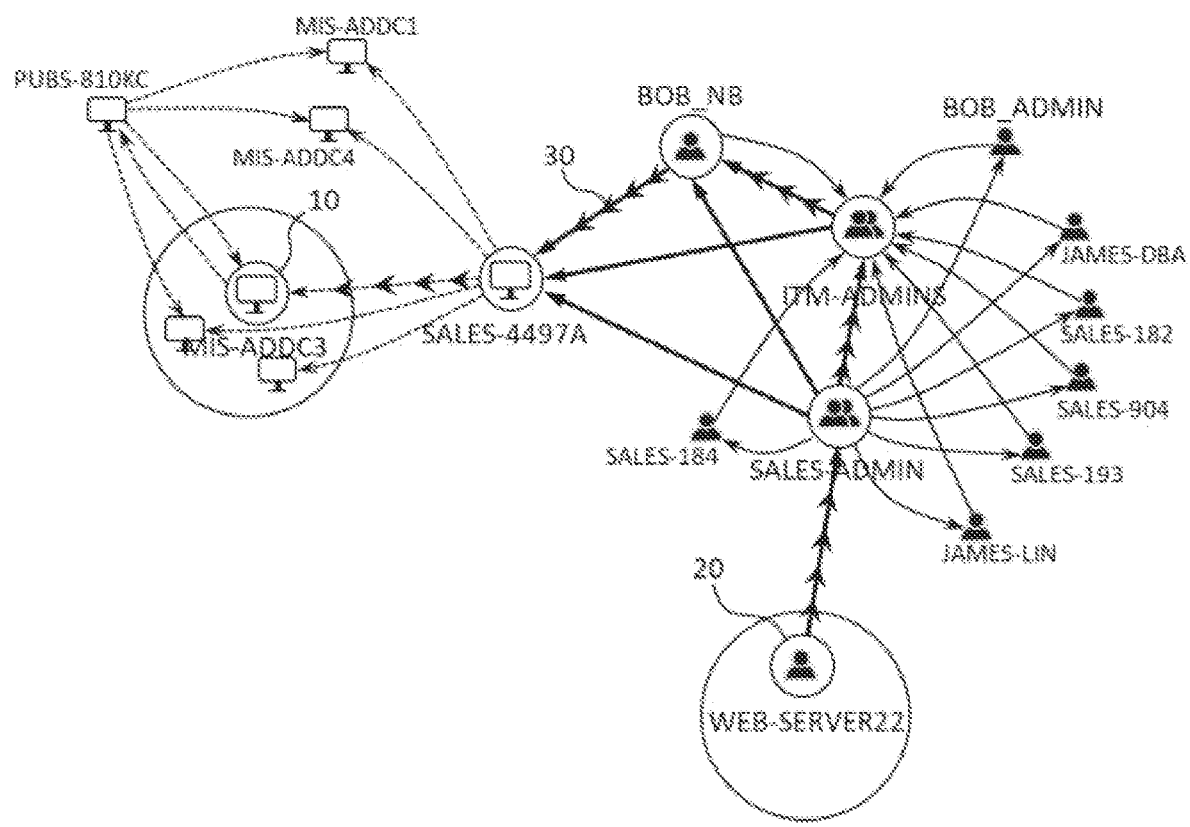
FIG. 1 is a network diagram and a schematic diagram showing a simulation result path of an embodiment of the present disclosure.

Referring to the accompanying drawings, this embodiment is a method for predicting an attack path of hackers, including the following steps: performing an operation of at least one rule according to men, machines and network data in a domain, and then obtaining at least one path formed by combining the men, the machines and the network data. Furthermore, this embodiment also discloses a server for executing the method according to claim 1. Disclosed is software, which can perform the method after executed by a computer. Disclosed are software and a server, as well as a presentation method for predicting an attacked path. A network diagram is displayed on a display. As shown in FIG. 1, the network diagram is formed by combining men, machines and network data in the domain, and the path obtained after executing the method is highlighted.

Simulating operation is performed by the "men", "machines", and "network resources" and a network environment composed thereof described in this embodiment, where the "man" is defined as an ID account or other records, user accounts or user groups used for representing user identities. The "machine" includes any device that can be connected to the domain, such as a computer, a mobile apparatus, a multi-function product and a telephone. The "network resource" includes related data about a domain controlling apparatus (or referred to as a domain control station), a mail or a mail system, a system profile, an organizational unit, a forest, etc. In addition, a device executing the method of this embodiment may be any computer host or network connection controlling apparatus within a simulated testing region, or a computer device connected by an external network or a cloud host device.

Additionally, in this embodiment, the result data of endpoint detection & response (EDR) analysis may be further combined to serve as one of the parameters of an analysis judgment path, including but not limited to: user accounts directly logged in or remotely accessed, host names, and local locations and external addresses connected to server hosts.

Furthermore, in the present disclosure, a visualized account relationship and a management architecture are obtained after analysis, and attack paths under various conditions can also be simulated and predicted by using deep machine learning, followed by defense evaluation, and a threat boundary is quantified and a best attack breakpoint is evaluated by the deep machine learning, thereby achieving the effect of effectively strengthening defense.

Referring to FIG. 1, labeling an attacked path in an enterprise network environment is showed. In an embodiment of the present disclosure, an active directory (AD) server being an attacked target 10 is taken as an example. The host MIS-ADDC3 logging in the active directory server was connected to a machine SALES-4497A, and there is a potential possibility of stealing data from login credentials in a memory. The machine SALES-4497A can be logged in directly with a BOB_NB account, while the BOB_NB account belongs to an ITM-ADMINS group, and ITM-ADMINS and SALES-ADMIN have part of account members in common. A WEB-SERVER22 account also has a privilege to control SALES-ADMIN member thus forming an attack path 30 to the machine SALES-4497A. Since the WEB-SERVER22 account is a server user account, there is a potential risk that login credentials can be extracted (Kerberoasting). Therefore, a machine logged in from a start point account 20 (WEB-SERVER22) points to, via groups ITM-ADMINS and SALES-ADMIN, the machine the BOB_NB account logs in, while the machine SALES-4497A the BOB_NB account logs in has a certain probability of being logged in by the host MIS-ADDC3. Therefore, a path through the machine SALES-4497A to the active directory server is a possible attacked path 30.

Furthermore, FIG. 1 further shows a pointing relationship between each machine node and other machines on the attacked path. For example, there are also accessed paths between the machine SALES-4497A and the account groups ITM-ADMINS and SALES-ADMIN, as well as between the account group ITM-ADMINS and other accounts SALES-182, SALES-904, . . . , between the account group ITM-ADMINS and the machine the account BOB_ADMIN logs in. In an embodiment of the present disclosure, the probability of the attacked path pointing to the attacked target 10 presented in the present disclosure is higher than that of these other paths, and the machine the account BOB_ADMIN logs in or other machines SALES-182, SALES-904, . . . , accessing the machine on the attacked path is presented in a different presentation way from that of the attacked path.

Figure 2:
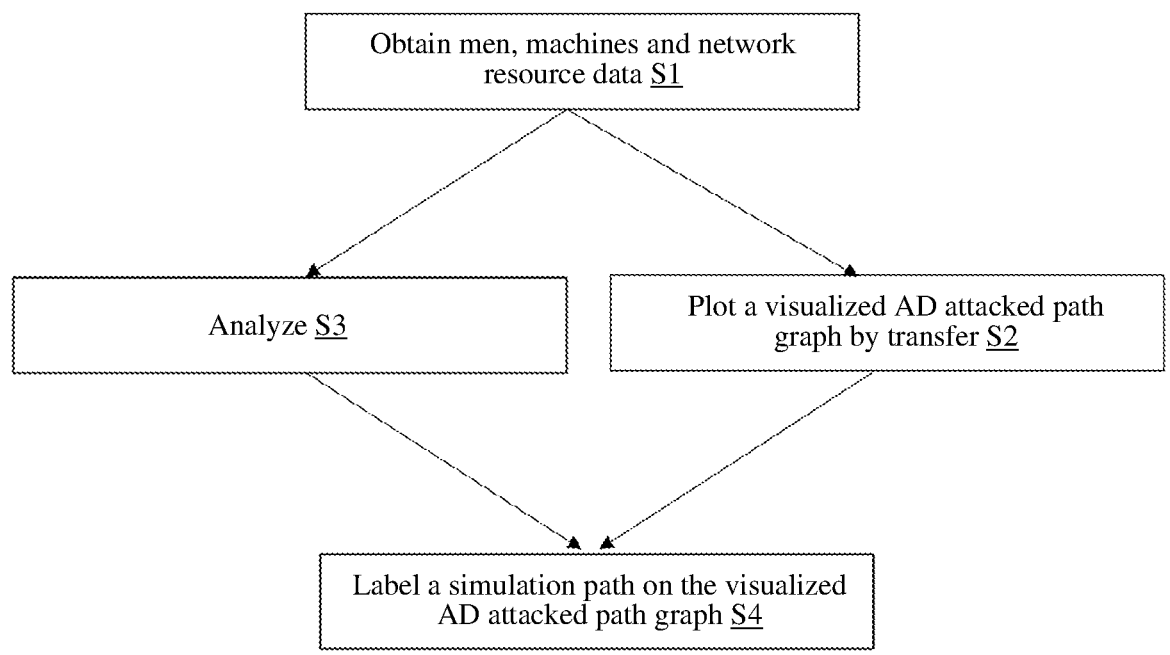
FIG. 2 is a flowchart of the related execution steps of an embodiment of the present disclosure.

Additionally, FIG. 2 shows a flowchart of the related implementation steps of an embodiment of the present disclosure. The method of the present disclosure includes: step S1: The men, machines and network resource data are obtained. As mentioned previously, the men, machines and network resource data in the network are obtained through EDR or other ways, and is entered into a storage space. Step S2: a visualized AD attacked path graph is plotted by transfer. Related tasks such as classification, analysis and category judgment are performed according to the above data, and then, the visualized AD attacked path graph is plotted according to their respective attributes. Step S3: analysis is performed. This step has no sequential relationship with step S2, and can be operated simultaneously or in a reverse order. Intrusions are simulated and their respective probabilities of occurrence are calculated through at least one logical algorithm or an artificial intelligence system, and the most likely attacked path is presented according to the conversion of each probability. Step S4: a simulated attacked path is labeled on the visualized AD attacked path graph.

The present disclosure overcomes the problems in the prior art, and provides a prediction method, software and a server, capable of predicting an attacked path of hackers, as well as a presentation method for predicting an attacked path, in particular a method for performing analysis via men, machines, network resources and a network environment composed thereof and software, and a server installed with the software corresponding to the method, as well as a method for presenting results after the combination of the men, the machines and the network resources. Through the presentation method of the present disclosure, an analyst can more intuitively and quickly grasp a key account. In particular, a real attack is not launched, and a high-privilege account of the AD or any modification of the AD is not required in the present disclosure, so there is no need to worry about additional influences. The present disclosure has the effects of low simulation implementation cost, rapid measurement of data security and rapid evaluation of defense. Additionally, the present disclosure has the following characteristics: all possible attacked paths can be intelligently calculated, an abnormal privilege relationship between AD objects is visualized, AD setting weaknesses and common potential security issues are checked, and potential virtual groups and hidden privilege accounts are detected.

Figure 3:
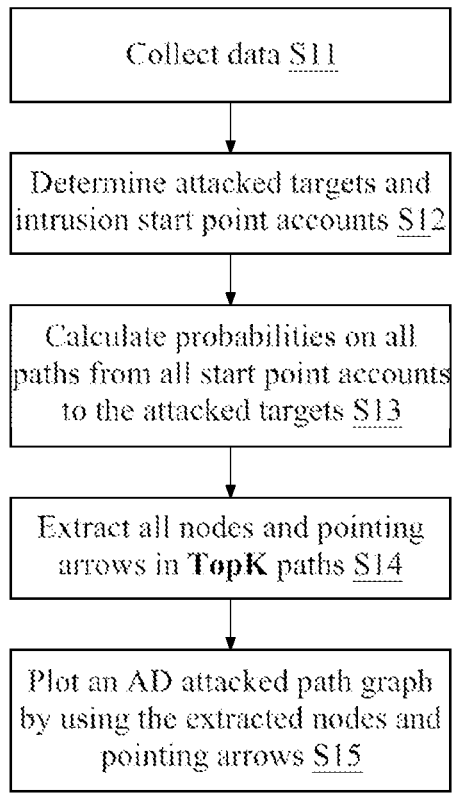
FIG. 3 is a flowchart of the related execution steps of another embodiment of the present disclosure.

Referring to FIG. 3, a flowchart of the related execution steps of another embodiment of the present disclosure is showed. The method of the present disclosure is implemented in a system for predicting an attacked path on enterprise networks. The system includes a record server and a prediction unit, where the prediction unit executes the following steps: step S11: collect data, by reading a plurality of accounts, a plurality of machines, and network resource data of the enterprise networks from the record server, where the accounts or machines have their respective privilege levels. The plurality of machines include servers that store an active directory (AD) database, a research and development database, an accounting database and the like, and the accounts of employees can log in their respective machines to access these databases directly, or indirectly by connecting to other machines. The network resource data are selected from related data about the domain controlling apparatus, the mail or the mail system, the system profile, the organizational unit, the forest, etc. In different embodiments of the present disclosure, the network resource data includes records of each account logging in the plurality of machines for access, or the result data of endpoint detection & response (EDR) analysis, or a log file of each machine.

Step S12: the attacked targets and the intrusion start point accounts are determined, where the attacked target (referred to as Explicit Admin) is a plurality of machines some of which can be logged in by the Explicit Admin, such as the active directory server. In different embodiments of the present disclosure, the attacked target can be specified according to the purpose of the data security, or a machine logged in with an important account, or the attacked target can be determined by network resource data according to set conditions. For example, the conditions for a server or machine being included in the attacked targets are as follows: a machine logged in with the account of an enterprise supervisor; the relative identifier (RID) in the security identifier (SID) ending with one of 500, 512, 516, 518, 519, 525, 526 and 517; the node type being Domain; a member of a group in a blacklist specified by the user; SID of the group being one of ['s-1-5-9', 's-1-5-32-544', 's-1-5-32-548', 's-1-5-32-549', 's-1-5-32-550', 's-1-5-32-551'], and members of these groups. If any of the aforementioned conditions is met, the server or the machine can be considered as the attacked target. In different embodiments of the present disclosure, there is more than one path between the attacked target and the machine logged in with the intrusion start point account, and the attacked path is composed of the machine logged in with the intrusion start point account, the attacked target and at least one pointing arrow, where the pointing arrow indicates a direct access direction between machines; or the attacked path is composed of the machine logged in with the intrusion start point account, the attacked target, at least one node and at least two pointing arrows, where the node is a machine that the machine logged in with the intrusion start point account is indirectly connected to access the attacked target.

Step S13: the evaluated values between nodes on all paths from the start point account to the attacked target are calculated. The path from the start point account to the attacked target refers to a path formed by the machine logged in with the start point account accessing the machine of the attacked target directly, or indirectly by connecting to other machines. The node between the machine logged in with the start point account and the machine of the attacked target on this path may be a gateway server or a machine logged in with other accounts. There are pointing arrows between the nodes, indicating accesses between machines, and the evaluated values of access between the nodes can be calculated by using the network resource data.

In an embodiment of the present disclosure, the evaluated value of access between the nodes may be the probability of accessing data stored by the machine that is determined based on the network resource data of the node. In another embodiment of the present disclosure, the evaluated value of access between the nodes may be a set value determined based on the privilege of the account logging in the machine or the privilege granted by a unit-owned machine.

Referring to FIG. 3 further, step S14: all nodes and pointing arrows in the Top K paths are extracted. According to step S13, the evaluated values between nodes on all paths from the start point accounts to the attacked targets are calculated, and thus, the evaluated value of each path can be calculated. Then, the evaluated values of all the paths are sorted in descending order, and paths of the top K evaluated values are extracted and considered as K possible attacked paths from the machines logged in with the start point accounts to the attacked targets; and following the pointing arrow, the attacked targets are pointed to from the machines logged in with the start point accounts, and the K possible attacked paths are established. Step S15: a visualized AD attacked path graph is plotted by using the extracted nodes and the pointing arrows, as shown in FIG. 4, and the K possible attacked paths and the calculated evaluated values of each path are labeled on the visualized AD attacked path graph.

Figure 4:
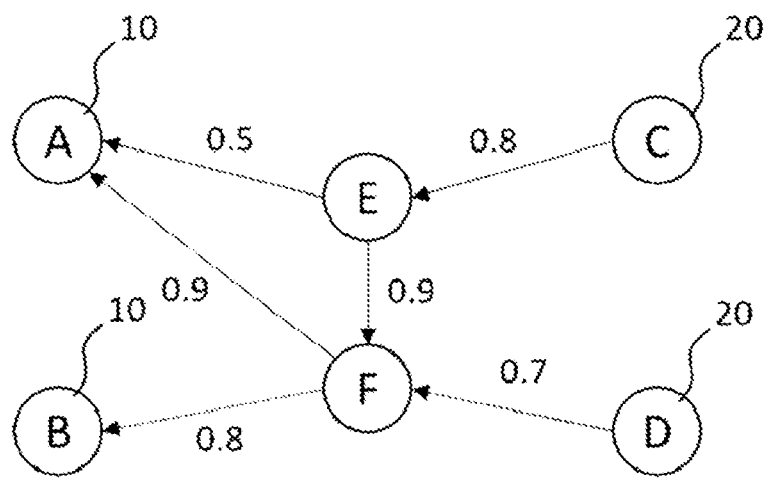
FIG. 4 is a network diagram of presenting at least one attacked path of an embodiment of the present disclosure.

Referring to FIG. 4, a network diagram of presenting at least one attacked path of an embodiment of the present disclosure is showed. In an embodiment of the present disclosure, the network diagram shown in FIG. 4 can be considered as a visualized AD attacked path graph of an enterprise network. The visualized AD attacked path graph is composed of 6 nodes and pointing arrows between some nodes. In different embodiments of the present disclosure, each node can be considered as a machine with a privilege level or considered as a machine logged in with an account with the privilege level. For example, node A can be considered as machine A with the privilege level or considered as a machine logged in with account A with the privilege level.

Each pointing arrow between nodes has an evaluated value, and the evaluated value may be the probability of access between machines. In an embodiment of the present disclosure, the evaluated value may be the probability accessing the data stored by the machine that is determined based on the network resource data of the node. For example, the pointing arrow between node E and node A has the evaluated value of 0.5 which may be the probability of accessing the data stored by machine A can be calculated according to the log file of machine E, such as when there are two machines that E can be connected to access other machines, then the probability of accessing the data stored by machine A is 0.5; or may be the probability of the data being stolen due to that the machine logged in with the account A was connected to machine E to access the data, calculated according to the result data of endpoint detection & response (EDR) analysis; or may be calculated by taking both into account. In another embodiment of the present disclosure, the evaluated value may also be a set value determined based on the privilege level of the account logging in the machine or a privilege level granted by a unit-owned machine. For example, in enterprise network management, privilege levels are divided into "important", "major", "minor" and "basic", with corresponding evaluated values of 1 (100%), 0.8 (80%), 0.6 (60%), and 0.2 (20%), respectively. Enterprise personnel-owned accounts will be assigned corresponding privilege levels, or the unit-owned machines will be assigned corresponding privilege levels. For example, the pointing arrow between node F and node B has the evaluated value of 0.8, which can be determined according to the privilege level of machine F being "major" or by logging in machine F with an account with a privilege level being "major".

Referring to FIG. 4 further, and referring to FIGS. 2 and 3 together, according to the presentation method and prediction method for predicting the attacked path on the enterprise networks of the present disclosure, after the plurality of accounts, the plurality of machines and network resource data of the enterprise networks are obtained (steps S1 and S11), analyzing the network resource data may determine at least one attacked target 10 and at least one start point account (steps S3 and S12). In different embodiments of the present disclosure, the attacked target 10 may be a server that stores data about enterprise operations, management, research and development, accounting, etc., or a machine logged in with the account of the enterprise supervisor or network administrator; while the start point account may be an account used by a new employee of the enterprise or an account opened for use by outsourcing vendors. Furthermore, analyzing the network resource data can also obtain the evaluated values of the nodes that compose the enterprise networks and the mutual access between nodes. Each node is a machine or a machine logged in with an account, and the evaluated values between the nodes may be the probability of accessing the data stored by the machine, or is determined by the privilege level of the account logging in the machine or the privilege level granted by the unit-owned machine.

In the network diagram as shown in FIG. 4, with nodes A and B as the attacked targets 10 and accounts C and D as intrusion start point accounts 20, an AD attacked path graph can be plotted through analysis of the network resources (steps S2 and S15). All paths where a machine logged in with account C accesses attacked targets A and B indirectly via other machines E and F include: C->E->A, C->E->F->A and C->E->F->B. All paths where a machine logged in with account D accesses the attacked targets A and B indirectly via other machine F include: D->F->A and D->F->B. The evaluated values of all paths from the machines logged in with accounts C and D to the attacked targets A and B (steps S3 and S13) are calculated, and the following 5 results can be obtained:

Evaluated value of path $C\text{->}E\text{->}A = 0.8*0.5 = 0.4$

Evaluated value of path $C\text{->}E\text{->}F\text{->}A = 0.8*0.9*0.9 = 0.648$

Evaluated value of path $C\text{->}E\text{->}F\text{->}B = 0.8*0.9*0.8 = 0.576$

Evaluated value of path $D\text{->}F\text{->}A = 0.7*0.9 = 0.63$

Evaluated value of path $D\text{->}F\text{->}B = 0.7*0.8 = 0.56$

Next, all nodes of the Top K paths and the pointing arrows between the nodes are extracted (steps S3 and S14). For example, according to the above 5 evaluated values of all the paths, the following top 3 paths are extracted: Path C->E->F->A, Path D->F->A and Path C->E->F->B. The AD attacked path graph as shown in FIG. 4 is plotted according to nodes A, B, C, D, E and F of the top 3 paths and the pointing arrows between the nodes (steps S2 and S15). When one of the possible attacked paths of the top 3 paths is labeled on the visualized AD attacked path graph (step S4), there will be a visual difference between presenting the pointing arrow on the possible attacked path 30 and presenting the pointing arrow that is not on the attacked path. For example, when the possible attacked path C->E->F->A is presented, the pointing arrow on the attacked path is presented as a solid line or one color, while the pointing arrow that is not on the attacked path is presented as dashed lines or another color.

What is claimed is:

1. A method for predicting an attacked path on enterprise networks, comprising:
   reads records of a plurality of accounts, a plurality of machines and network resource data, and the plurality of accounts or the plurality of machines having their respective privilege levels;
   determining, according to the network resource data, at least one of the plurality of machines being at least one attacked target;
   calculating a plurality of evaluated values of executing access on other machines of all of the plurality of accounts logging into at least one machine;
   calculating an evaluated value of at least one path where all of the plurality of accounts log in at least one machine to access the at least one attacked target directly, or an evaluated value of at least one path where all of the plurality of accounts access the at least one attacked target indirectly by connecting to other machines; and
   determining, according to the evaluated value of the at least one path, whether the at least one path is an attacked path or not.

2. The method according to claim 1, wherein the evaluated value is the probability of access between machines, and the probability of the attacked path is higher than that of other paths.

3. A system for predicting an attacked path on enterprise networks, comprising:
   a record server, configured to record a plurality of accounts, a plurality of machines and network resource data; and
   a prediction server, configured to connect to the record server, and execute the method according to claim 1.

4. A computer program product comprising a non-transitory computer readable medium storing a program, the program being loaded by a microprocessor of a computer to execute:
   reads records of a plurality of accounts, a plurality of machines and network resource data, wherein the accounts or machines have their respective privilege levels;
   determines, according to the network resource data, at least one of the plurality of machines being at least one attacked target;
   calculates a plurality of evaluated values of executing access on other machines of all accounts logging into at least one machine;
   calculates an evaluated value of at least one path where all accounts log in at least one machine to access the at least one attacked target directly, or an evaluated value of at least one path where all the accounts access the at least one attacked target indirectly by connecting to other machines; and
   determines, according to the evaluated value of the at least one path, whether the at least one path is an attacked path or not.

5. The computer program product according to claim 4, wherein the evaluated value is a probability of access between machines, and the probability of the attacked path is higher than that of other paths.

* * * * *